US007816636B2

(12) United States Patent
Yokochi

(10) Patent No.: US 7,816,636 B2
(45) Date of Patent: Oct. 19, 2010

(54) IMAGE READING APPARATUS HAVING A REARRANGING SECTION PROVIDING ADDRESSES FOR ACCESSING TO A STORAGE SECTION

(75) Inventor: Atsushi Yokochi, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1146 days.

(21) Appl. No.: 11/477,809

(22) Filed: Jun. 30, 2006

(65) Prior Publication Data
US 2007/0007435 A1 Jan. 11, 2007

(30) Foreign Application Priority Data
Jun. 30, 2005 (JP) .......................... P2005-191926

(51) Int. Cl.
*H01L 27/00* (2006.01)
(52) U.S. Cl. ................................. 250/208.1; 250/214 R
(58) Field of Classification Search ............. 250/208.1, 250/214 R; 358/445–448, 523; 348/320–324
See application file for complete search history.

(56) References Cited
U.S. PATENT DOCUMENTS
5,689,347 A * 11/1997 Naoi .......................... 358/444

FOREIGN PATENT DOCUMENTS
| JP | 58-114668 | 7/1983 |
|---|---|---|
| JP | 59-194563 | 11/1984 |
| JP | 62-006574 | 1/1987 |
| JP | 6-189080 | 7/1994 |

* cited by examiner

*Primary Examiner*—Que T Le
(74) *Attorney, Agent, or Firm*—Banner & Witcoff, Ltd.

(57) ABSTRACT

An image reading apparatus that includes: an image sensor that outputs image signals in parallel from each block composed of an element group, photoelectric conversion elements arrayed in a main scanning direction being divided into the blocks; a serial transmission section that serializes and outputs the image signals outputted in parallel from the image sensor; a sampling section that samples the serialized image signals to add the blocks, to which the image signals belong, as block information to the respective image signals; a storage section that stores the image signals on the basis of a predetermined address; and a rearranging section that gives addresses for accessing to the storage section on the basis of the block information so that the image signals are arrayed from a head for the respective blocks in the main scanning direction of the image sensor, thereby to read/write the sampled image signals from/in the storage section.

18 Claims, 8 Drawing Sheets

IMAGE READING APPARATUS HAVING A REARRANGING SECTION PROVIDING ADDRESSES FOR ACCESSING TO A STORAGE SECTION

CROSS REFERENCE TO RELATED APPLICATION

This application claims priority from Japanese Patent Application No. 2005-191926, filed on Jun. 30, 2005, the entire subject matter of which is incorporated herein by reference.

TECHNICAL FIELD

Aspects of the present invention relate to an image reading apparatus for reading an image on the basis of an output signal of an image sensor having photoelectric conversion elements arrayed in a main scanning direction and more particularly to an image reading apparatus, in which the photoelectric conversion elements of the image sensor are divided into blocks of plural element groups so that the image signals are outputted in parallel from the individual blocks.

BACKGROUND

Conventionally, there has been known an image reading apparatus, in which a so-called flat bed scanner for scanning the image of a document by mounting an image sensor on a carriage built in a document placing table. The image reading apparatus is mounted on a copier or a multi function device. Also, a CIS (Contact Image Sensor) is known as the image sensor. In this CIS, the photoelectric conversion elements are arrayed in a main scanning direction thereby to output image signals according to the intensities of light beams received. Moreover, the photoelectric conversion elements arranged in the main scanning direction are controlled to output the image signals sequentially in one direction.

From the image sensor in the image reading apparatus, the image signals are sequentially outputted in the main scanning direction from the photoelectric conversion elements so that the scanning of the image of one line takes a time for outputting the image signals sequentially from the photoelectric conversion elements of one line. Proposals have been made to speed up the image reading apparatus by shortening the time period required for reading the images of one line with that image sensor. For example, JP-A-6-189080 discloses a configuration, in which the image signals are outputted in parallel by dividing the photoelectric conversion elements of the image sensor into the element groups.

SUMMARY

In a case where the image signals are outputted in parallel from the individual element groups of the image sensor, the image signals outputted have to be rearranged according to the order of the photoelectric conversion elements in the main scanning direction. If the image signals outputted in parallel from the image sensor are stored in the buffer memory and read out from the buffer memory in accordance with the order of the outputted photoelectric conversion elements in the main scanning direction, it is necessary to provide a buffer memory separately for writing the image signals outputted in parallel from the image sensor, for a subsequent line. By using two buffer memories or a buffer memory of a large capacity, specifically, the image signals outputted in parallel are written or read alternately for the individual lines.

It has also been proposed to write the image signals outputted in parallel from the element groups of the image sensor, at a predetermined address of the buffer memory, to read the written image signals at a predetermined sequence, and to write the next image signal at that read address. However, this address control is suited for the case, in which the individual element groups of the image sensor are composed of photoelectric conversion elements of an equal number. In a case where the individual element groups have photoelectric conversion elements of different numbers, the address control to be made on the image signals outputted in parallel for each line is complicated.

Aspects of the present invention provide an image reading apparatus that rearranges the image signals, which are outputted in parallel from individual blocks divided from photoelectric conversion elements of an image sensor into a plurality of element groups, easily by a storage section of a small capacity.

According to an aspect of the invention, there is provided an image reading apparatus including: an image sensor that outputs image signals in parallel from each of blocks composed of an element group, photoelectric conversion elements arrayed in a main scanning direction being divided into the blocks; a serial transmission section that serializes and outputs the image signals outputted in parallel from the image sensor; a sampling section that samples the serialized image signals to add the blocks, to which the image signals belong, as block information to the respective image signals; a storage section that stores the image signals on the basis of a predetermined address; and a rearranging section that gives addresses for accessing to the storage section on the basis of the block information so that the image signals are arrayed from a head for the respective blocks in the main scanning direction of the image sensor, thereby to read/write the sampled image signals from/in the storage section.

According to the image reading apparatus, the image signals for the individual blocks are outputted in parallel from the image sensor so that the image reading of the image sensor is speeded up.

Moreover, the storage area of the storage section is divided into the regions and the sub-regions of the same number as the block number thereby to facilitate the address generation for the area to read/write the image signals of the individual blocks.

At the time of writing the image signals in the storage section, moreover, the assignment is made to any of the regions having ended the scanning of the image signals written beforehand so that the image signals before read is not overwritten. As a result, the storage area of the storage section is efficiently used to reduce the storage area required of the storage section.

DETAILED DESCRIPTION

An aspect of the invention will be described with reference to the accompanying drawings.

Figure 1:
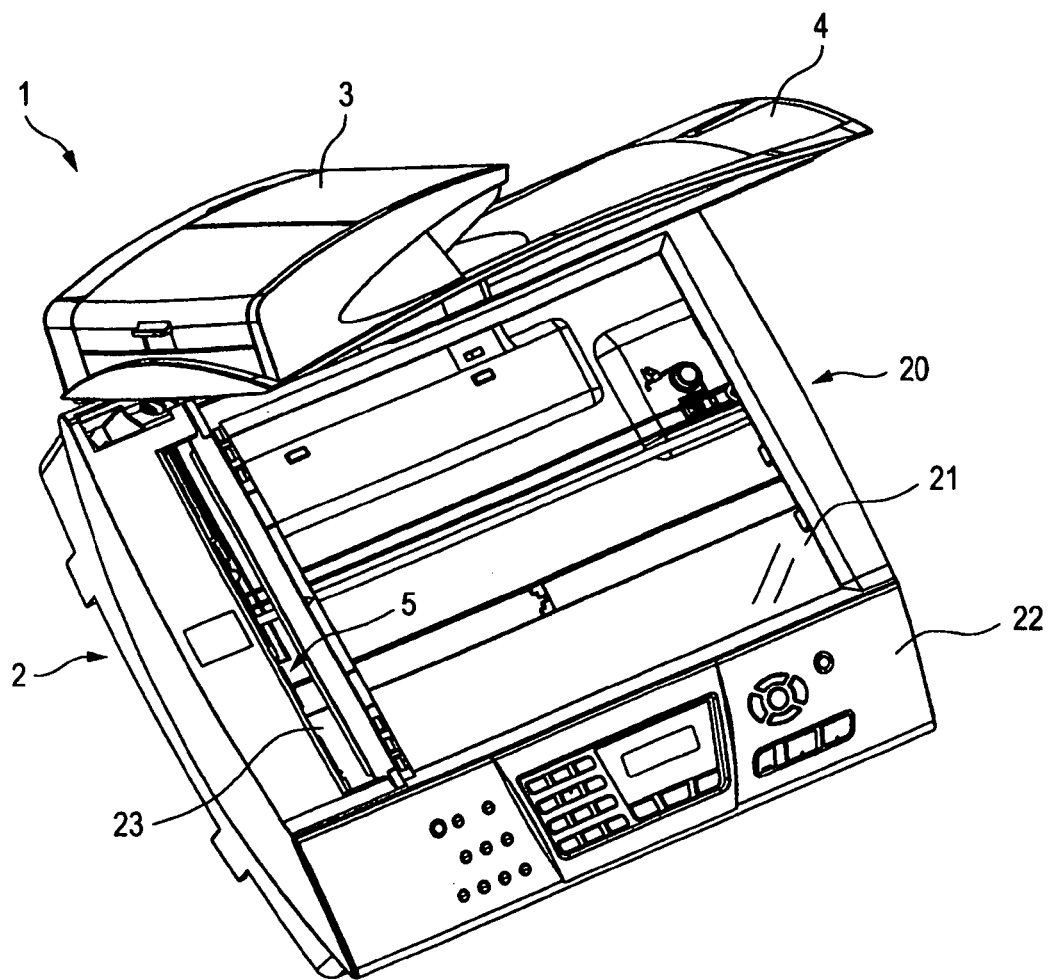
FIG. 1 is a perspective view showing an exterior configuration of an image reading apparatus according to an aspect of the invention.

FIG. 1 shows an exterior configuration of an image reading apparatus 1 according to an aspect of the invention. This image reading apparatus 1 is used, for example, either as a scanner unit of a multi-function device (MFD) having a printer function and a scanner function or as an image scanning unit of a copier. Incidentally, the printer function is optional. The image reading apparatus 1 may be realized as a flat bet scanner (FBS) having only the scanner function, for example.

In the image reading apparatus 1, as shown in FIG. 1, a document cover 4 having an automatic document feeder (ADF) 3 is attached in an openable/closable manner to a document placing table 2 functioning as the FBS. The document placing table 2 has a platen glass 21 arranged on the top face of a generally box-shaped casing 20 and an image scanning unit 5 built in the casing 2. The document placed on the platen glass 21 is fixed when the document cover 4 is closed. The image scanner unit 5 is moved along the document thereby to scan the image.

On the other hand, the document placing table 2 is equipped on its front face side with an operation panel 22. This operation panel 22 includes various operation buttons and a liquid crystal display unit. The image reading apparatus 1 is operated by instructions input through the operation panel 22. In a case where the present image reading apparatus 1 is realized as the MFD, it is operated not only by the instructions of the operation panel 22 but also by instructions transmitted from a computer connected therewith through a scanner driver.

The document cover 4 is equipped with the ADF 3 for transferring documents successively from a document tray to a discharge tray. In this transfer procedure by the ADF 3, the document passes through a platen 23, below which the image scanning unit 5 is positioned to read the image of the document. Incidentally, the ADF 3 is also an optional mechanism.

The image scanner unit 5 is configured such that an image sensor 24 is carried on a carriage and the carriage is reciprocated in parallel with the platen glass 21 by a mechanism such as a belt drive mechanism. The image sensor 24 is a so-called contact type and is generally called the CIS.

Figure 2:
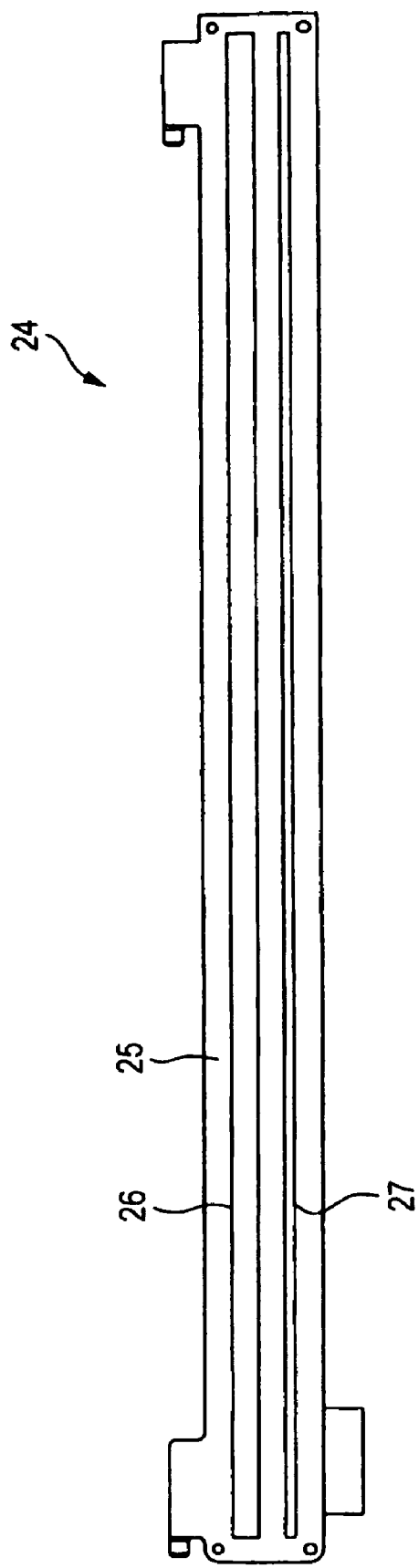
FIG. 2 is a top plan view showing an exterior configuration of an image sensor.

As shown in FIG. 2, the image sensor 24 is formed into a box shape and has an upper face 25 of a slender rectangular shape in a top plan view.

On the upper face 25, there is longitudinally arranged a light guide 26, which is built in the image sensor 24 for guiding the light of an LED. By this light guide 26, the light of the LED is irradiate to the side of the upper face 25 of the image sensor 24. On the upper face 25, moreover, there are arranged a plurality of condensing lenses 27 in one row in the longitudinal direction and in parallel with the light guide 26. In the image sensor 24, moreover, there are arranged a plurality of photoelectric conversion elements just below the condensing lenses in a row in the same direction as that of the condensing lenses 27. The light emitted from the LED irradiates a document to be scanned, and the reflected light is condensed onto the photoelectric conversion elements by the condensing lenses 27. The photoelectric conversion elements outputs image signals according to the intensities of the reflected lights. Thus, the image sensor 24 outputs the image of the document to be read, as the image signals.

Figure 3:
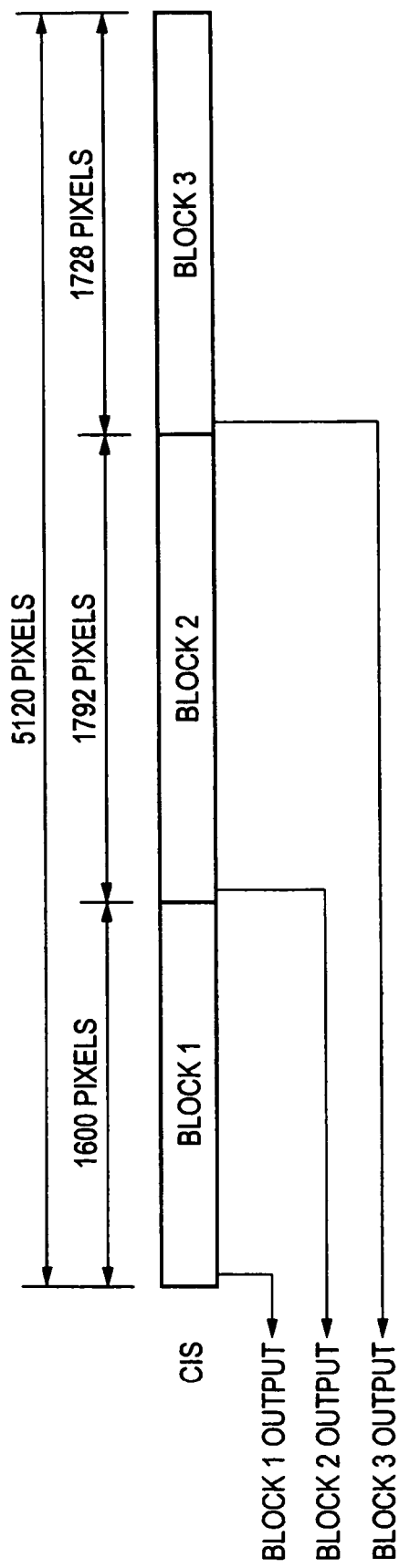
FIG. 3 is a schematic diagram showing the division of photoelectric conversion elements of the image sensor.

The photoelectric conversion elements arrayed in the longitudinal direction of the image sensor 24, i.e., in the main scanning direction are divided into blocks composed of an arbitrary element group. In this aspect, the photoelectric conversion elements of the image sensor 24 are divided into three blocks. As shown in FIG. 3, the photoelectric conversion elements arrayed in the main scanning direction of the image sensor 24 are 5,120 in number. Each of these photoelectric conversion elements correspond to one pixel in one line. In other words, one line of the image sensor 24 is composed of 5,120 pixels. These areas are called a block 1 (ch1), a block 2 (ch2) and a block 3 (ch3) from the upstream side of the main scanning direction. The upstream side of the main scanning direction of the image sensor 24 is the upstream side of the direction for the image sensor 24 to output the image signals of 5,120 pixels sequentially, and is located on the left side of FIG. 2.

The number of pixels to be contained in each block can be arbitrarily set. In this aspect, the 5,120 pixels of one line are so divided into three that the block1 may have 1,600 pixels, the block 2 the 1,792 pixels, and the block 3 the 1,728 pixels. Each of the blocks 1, 2 and 3 is equipped with an output line for outputting the image signals from the photoelectric conversion elements owned by each block. The image sensor 24 is fed with a trigger signal TG as a control signal and then with a clock signal CLK, synchronously of which the image signals from the photoelectric conversion elements owned by each of the blocks 1, 2 and 3 are outputted from the blocks. In other words, the image sensor 24 outputs the image signals in parallel from each of the blocks 1, 2 and 3 in synchronism with the clock signal CLK.

The image signals from the blocks 1, 2 and 3 are respectively outputted from the three output lines which are disposed to correspond to the blocks 1, 2 and 3. In each of the blocks, the image signals of the individual photoelectric conversion elements are sequentially switched from the photoelectric conversion elements on the upstream side of the main scanning direction and are outputted. From the block 1, more specifically, the image signals of the 1st pixel to the 1,600-th pixel are serially outputted. From the block 2, the image signals of the 1601-st pixel to the 3,392-nd pixel are serially outputted. From the block 3, the image signals of the 3,393-rd pixel to the 5,120-th pixel are serially outputted.

The output lines of the image sensor 24 are electrically connected with a control unit of the image reading apparatus 1. The control unit of the image reading apparatus 1 includes a CPU for various operations; a ROM stored with various control programs; a RAM for storing data temporarily; and an ASIC for driving a drive circuit or various interfaces.

Figure 4:
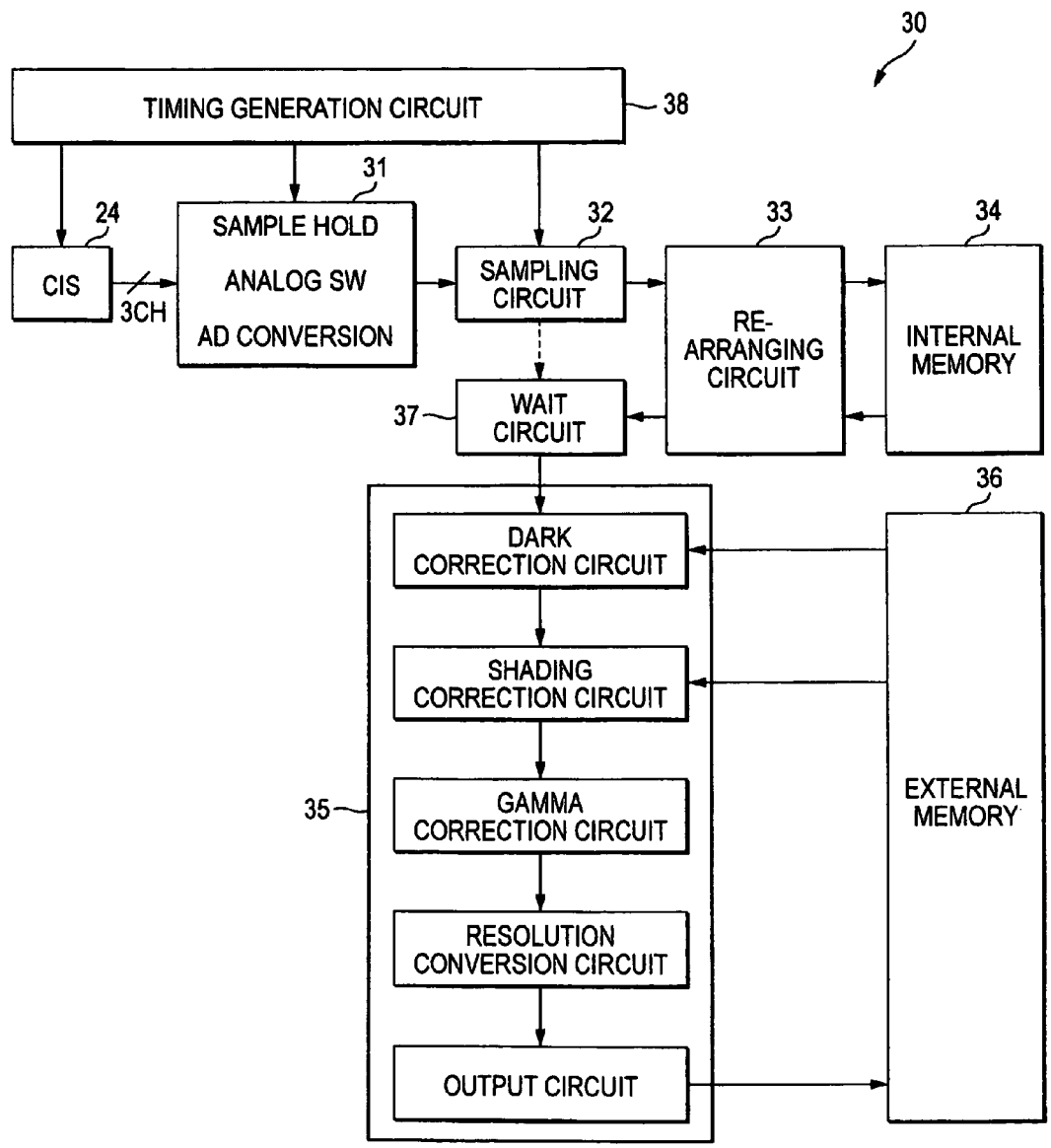
FIG. 4 is a block diagram showing a configuration of a control unit.

FIG. 4 shows the configuration of a control unit 30 of the image reading apparatus 1. This control unit 30 includes an analog front end circuit 31 (or serial transmission section); a sampling circuit 32; a rearranging circuit 33; an internal memory 34 (or storage section); a correction processing circuit 35; an external memory 36; and a wait circuit 37. Here, the trigger signal TG, the dock signal CLK and the sampling timing to be applied to the image sensor 24 are fed from a timing generation circuit 38 for generating the control signal of the analog front end circuit 31.

The output control of the image sensor 24 by the control unit 30 is detailed in the following.

When the medium to be read is irradiated from the LED of the image sensor 24 so that the reflected light of the document is condensed by the condensing lenses 27 on the individual photoelectric conversion elements arrayed in the main scanning direction, each photoelectric conversion elements store the electric charges according to the light intensities received.

Figure 5:
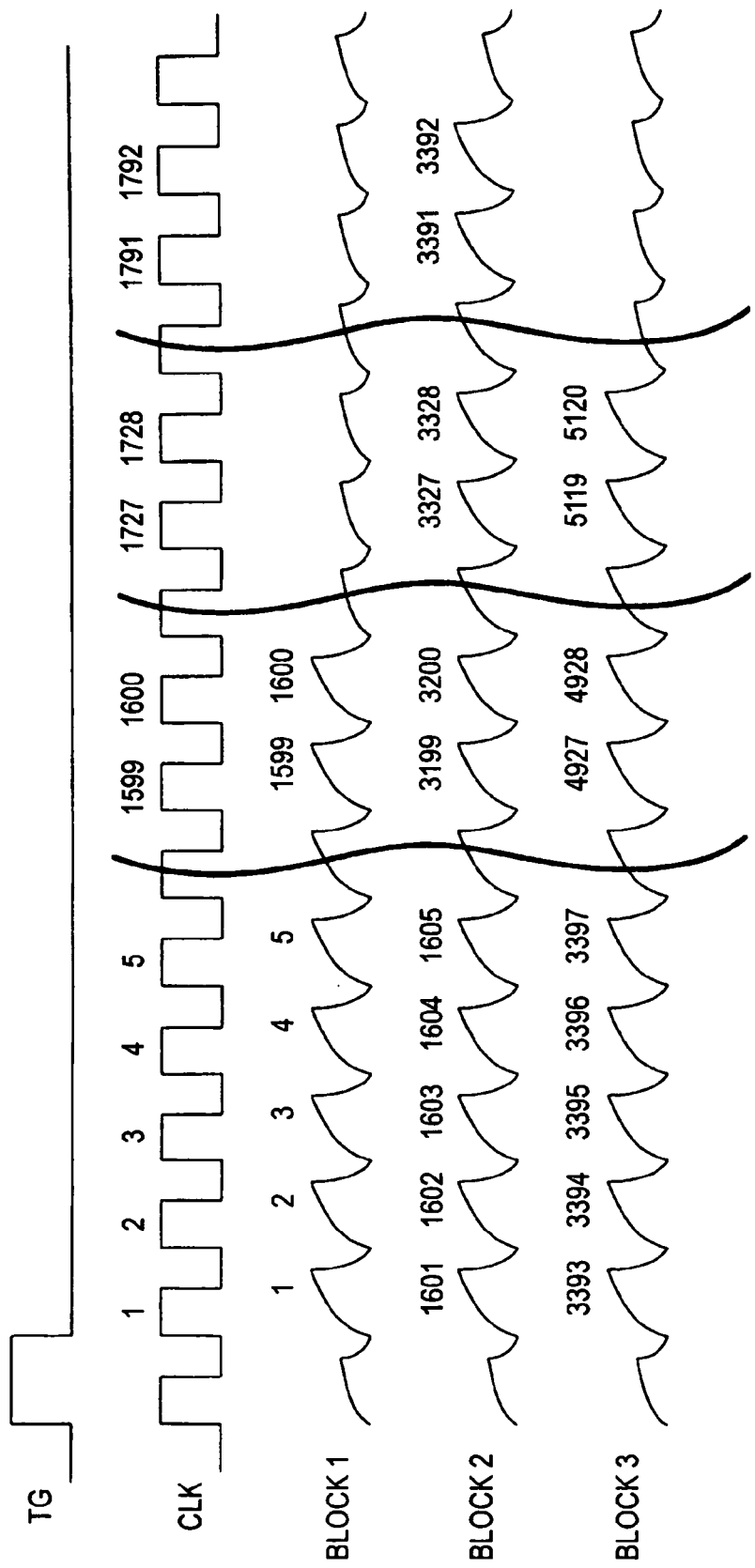
FIG. 5 is a diagram showing control signals of the image sensor and image signals to be outputted.

The image sensor 24 is fed with the clock signal CLK as the control signal, as shown in FIG. 5, after fed with the trigger signal TG indicating the start of one line. On the basis of this clock signal CLK, the blocks 1, 2 and 3 are simultaneously switched so that the three photoelectric conversion elements of the blocks 1, 2 and 3 output image signals according to the intensities of the intensities of lights received, in parallel to the outside.

On the basis of the first clock signal CLK, more specifically, the image signal of the 1st pixel from the block 1, the image signal of the 1,601-st pixel from the block 2, and the image signal of the 3,393-rd pixel from the block 3 are outputted in parallel. On the basis of the second dock signal CLK, consequently, the pixel signal of the 2nd pixel from the block 1, the pixel signal of the 1,602-nd signal from the block 2, and the pixel signal of the 3,394-th pixel from the block 3 are outputted in parallel. Likewise, on the basis of the dock signals CLK, the image signals are sequentially outputted in parallel from the three blocks. On the basis of the 1,600-th dock signal CLK, the pixel signal of the 1,600-th pixel from the block 1, the pixel signal of the 3,200-th pixel from the block 2, and the pixel signal of the 4,982-nd pixel from the block 3 are outputted in parallel. The block 1 is composed of the photoelectric conversion elements for the 1,600 pixels so that it does not output the image signal in response to the 1,601-st and subsequent clock signals CLK.

On the basis of the 1,728-th dock signal CLK, subsequently, the image sensor 24 of the 3,328-th pixel from the block 2 and the image sensor 24 of the 5,120-th pixel from the block 3 are outputted in parallel. The block 3 is composed of the photoelectric conversion elements for the 1,728 pixels so that it does not output the image signal in response to the dock signals CLK after the 1,728-st signal. On the basis of the 1,792-nd dock signal CLK, moreover, the pixel signal of the 3,392-nd pixel from the block 2 is outputted. Thus, the outputting of all the pixel signals of one line ends.

The analog image signals outputted in parallel from the image sensor 24 are sample-held by the analog front end circuit 31 and are digitized and converted and serialized. This digital conversion is to convert the analog image signals outputted from the image sensor 24 into digital signals composed of digital codes of a predetermined bit number. The digital conversion is performed by an analog/digital converter. The serialization is performed by outputting the three image signals outputted in parallel from the image sensor 24, in series in a predetermined sequence. The serialization of the image signals outputted in parallel is performed such that an analog switch switches any one of the output lines from the image sensor 24 sequentially. The sequence may be made by preceding either the digital conversion or the serialization.

The configuration may be configured such that the analog signals outputted in parallel from the image sensor 24 are serialized by the analog switch and the analog image signals serialized by the analog/digital converters are digitized. Then, the analog/digital converters can be shared for the blocks 1, 2 and 3.

On the other hand, the configuration is modified such that the three analog/digital converters correspond to the channels 1, 2 and 3 of the image sensor 24 and the analog image signals outputted in parallel from the blocks 1, 2 and 3 are digitized, and such that the digitized image signals of the blocks 1, 2 and 3 are serialized by the analog switch. According to this modification, the digitizing speeds of the blocks 1, 2 and 3 are improved.

The image signals of the blocks 1, 2 and 3, serialized by the analog front end circuit 31, are sampled by the sampling circuit 32. As shown in FIG. 5, the image signals outputted from the blocks 1, 2 and 3 are formed into predetermined waveforms. The sampling circuit 32 samples the image signals at the predetermined timings when the levels of the image signals outputted from the blocks 1, 2 and 3 are stabilized. Moreover, the sampling circuit 32 adds the blocks, to which each of the image signals belong, as the block information to each of the image signals sampled.

Figure 6:
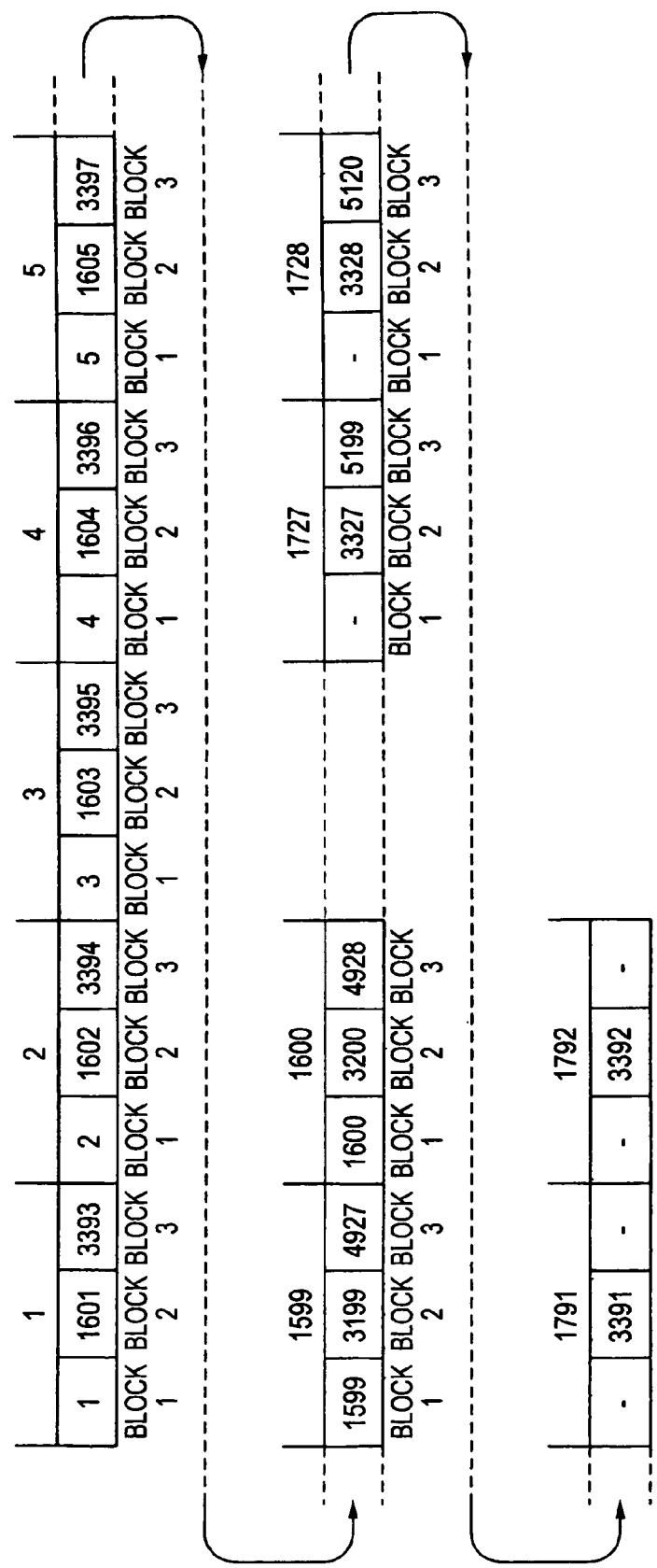
FIG. 6 is a diagram showing data to be outputted from a sampling circuit.

FIG. 6 schematically shows the image signals to be outputted from the sampling circuit. The analog switch of the analog front end circuit 31 switches the block 1, the block 2 and the block 3 sequentially in the recited order, and the image signals outputted in parallel from the image sensor 24 are serialized in the order of the block 1, the block 2 and the block 3.

Specifically, the image signals of the 1st pixel, the 1601-st pixel and the 3393-rd pixel, which are outputted in parallel from the blocks 1, 2 and 3 on the basis of the first clock signal CLK, are outputted in series in the order of the block 1, the block 2 and the block 3, so that the block information indicating the block 1 is added to the image signal of the 1st pixel, the block information indicating the block 2 is added to the image signal of the 1,601-st pixel, and the block information indicating the block 3 is added to the image signal of the 3,393-rd pixel.

Subsequently, on the basis of the second clock signal CLK, the 2nd pixel, the 1,602-nd pixel and the 3,394-th pixel outputted in parallel from the blocks 1, 2 and 3 are likewise outputted in series in the order of the block 1, the block 2 and the block 3, so that the block information indicating the block 1 is added to the image signal of the 2nd pixel, the block information indicating the block 2 is added to the image signal of the 1,602-nd pixel, and the block information indicating the block 3 is added to the image signal of the 3,394-th pixel. For the 3rd dock signal CLK to the 1,600-th dock signal CLK, the pixel signals of the predetermined pixels of the blocks 1, 2 and 3 are sequentially outputted in series together with the block information in the order of the block 1, the block 2 and the block 3.

For the outputs on the basis of the 1,601-st and subsequent clock signals CLK, not the image signal outputted from the block 1 but the image signals of the predetermined pixels outputted in parallel from the blocks 2 and 3 are outputted in series in the order of the blocks 2 and 3, and the image signal indicating the block 2 or the block 3 is added to the image signals.

For the outputs on the basis of the 1,729-th and subsequent clock signals CLK, not the image signals outputted from the blocks 1 and 3 but only the image signal of the predetermined pixel outputted from the block 2 is outputted, and the image signal indicating the block 2 is added to that image signal. The block information indicating the block 2 is added to the image signal of the 3,392-nd pixel of the block 2 outputted on the basis of the clock signal CLK of the 1,792-nd pixel, and the outputting of one line ends.

The image signals outputted from the sampling circuit 32 are so rearranged by the rearranging circuit 33 that they are arranged from the head of the image sensor 24 in the main scanning direction. For this rearrangement of the image signals, the image signals outputted from the sampling circuit 32 are written at predetermined addresses of the internal memory 34, and the image signals written in the internal memory 34 are read out in a predetermined order. The internal memory 34 for the rearranging circuit 33 to read/write the image signals belongs to the inside of the circuit forming the rearranging circuit 33.

The rearranging circuit 33 divides the storage area of the internal memory 34 into regions of the same block number as that of the image sensor 24. In short, the rearranging circuit 33 divides the storage area into three. Each of the three-divided regions of the internal memory 34 have a capacity capable for storing the image signals of the block of the maximum pixel number of the image sensor 24. Moreover, the regions are equally divided.

More specifically, the block having the maximum pixel number of the image sensor 24 is the block 2 at the center of the main scanning direction, and has 1,792 pixels. The internal memory 34 is required to have a capacity of nine times as large as the quotient of the pixel numbers of the block 2 divided by the block number 3. Of the quotient of the pixel numbers of the block divided by the pixel block 3, the decimal number or less is raised. If one pixel is expressed with a digital code of 1 byte, the quotient of the 1,792 pixels divided by 3 and having its decimal number or less raised is 598. The 1,794 bytes as large as three times of 598 is the capacity of one region or one third of the internal memory. Moreover, the capacity required for the internal memory 34 is 5,382 bytes.

If the total pixel number 5,120 of the image sensor 24 is expressed with 1 byte for 1 pixel, the memory capacity of 2 lines determined for reading/writing each line alternately is 10,240 bytes. Therefore, the internal memory 34 is realized with a capacity smaller than the memory capacity of the image sensor 24 for 2 lines. In other words, the storage area of the internal memory 34 is efficiently used to reduce the storage area required on the internal memory 34.

Moreover, the rearranging circuit 33 divides each region of the internal memory 34 equally with the block number 3 into sub-regions. That is, the storage area of the internal memory 34 is equally divided into three regions, and each region is divided into three sub-regions. The rearranging circuit 33 reads/writes the image signals, which are outputted from the sampling circuit 32, in/out the internal memory 34 with the addresses that are generated on the basis of the address counter of each block and the offset addresses corresponding to the regions and the sub-regions. Moreover, the internal memory 34 stores the image signals on the basis of the predetermined addresses generated.

Figure 7:
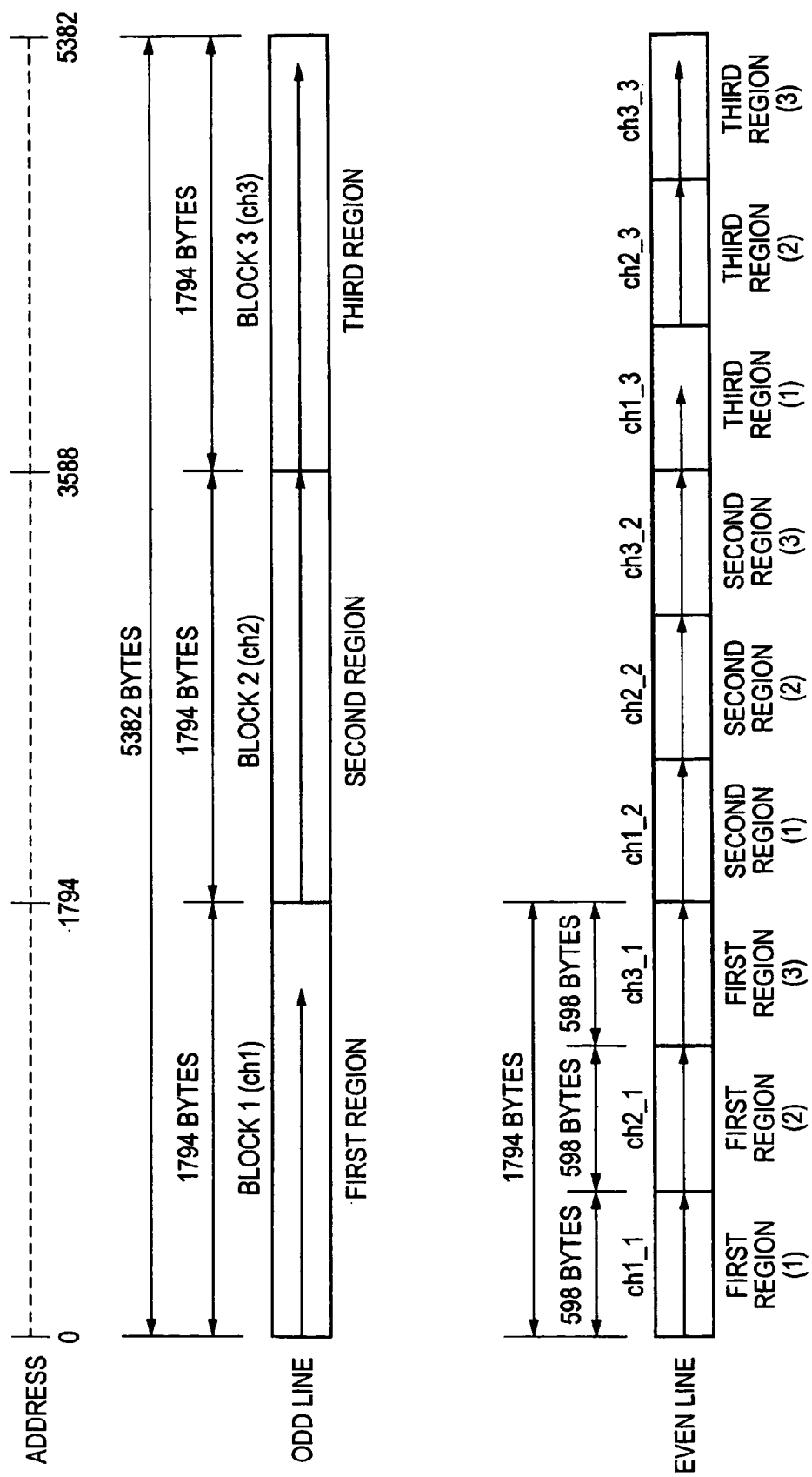
FIG. 7 us a diagram showing a method for using an internal memory.

How to write the image signals in the internal memory 34 by the rearranging circuit 33 is described with reference to FIG. 7. The rearranging circuit 33 writes the output of each line of the image sensor 24 by changing the method of writing the output in the internal memory 34 for odd lines and even lines. Here, the methods of reading/writing from/in the internal memory 34 for the odd lines and for the even lines to be described in more detail can be interchanged. In short, the reading/writing method in the internal memory 34 is changed for each line.

The first line is described as the odd line. When the image signal of each block of the first line is to be written in the internal memory 34, the addresses corresponding to the three regions of the internal memory 34 are generated. For address generations of the odd line, the rearranging circuit 33 is provided with the address counters (ch1_wr_acount, ch2_wr_acount and ch3_wr_count) of the blocks 1, 2 and 3 and the offset addresses (ch2_offset1 and ch3_offset1) for the odd line corresponding to the blocks 2 and 3. The address counters (ch1_wr_acount, ch2_wr_acount and ch3_wr_acount) are counted up each time one of the image signals of the blocks 1, 2 and 3 is written. The offset addresses (ch2_offset1 and ch3_offset1) correspond to the capacities of the regions of the internal memory 34. The offset address (ch2_offset1) provided for the block 2 corresponds to the capacity (1,794 bytes) of the first block. The offset address (ch3_offset1) provided for the block 3 corresponds to the capacity (3,588 bytes) of the first region and the second region. Here, the two times of the offset address (ch2_offset1) for the block 2 is the offset address (ch3_offset1) for the block 3.

The rearranging circuit 33 receives the serialized image signals of the first line shown in FIG. 6, from the sampling circuit 32. Moreover, the image signals of the 1st pixel, the 1,601-st pixel and the 3,393-rd pixel outputted in parallel from the blocks 1, 2 and 3 on the basis of the first clock signal CLK are respectively written in the first region, the second region and the third region of the internal memory 34 on the basis of the respective block information.

The image signal of the 1st pixel of the block 1 is given the address, e.g., the 0-th address corresponding to the 1st address of the first region of the internal memory 34 by the address counter (ch1_wr_acount) corresponding to the block 1, and the pixel signal of the 1st pixel is written at the 0 address of the internal memory 34. Here, the 0 address to 1,793-rd address belong to the first region of the internal memory 34.

The image signal of the 1,601-st pixel of the block 2 is given the address, e.g., the 1,794-th address corresponding to the first of the second region of the internal memory 34 by the address counter (ch2_wr_acount) and the offset address (ch2_offset1) corresponding to the block 2, and the pixel signal of the 1,601-st pixel is written at the 1,794-th address of the internal memory 34. Here, the 1,794-th address to 3,587-th address belong to the second region of the internal memory 34.

The image signal of the 3,393-rd pixel of the block 3 is given the address, e.g., the 3,588-th address corresponding to the first of the third region of the internal memory 34 by the address counter (ch3_wr_acount) and the offset address (ch3_offset1) corresponding to the block 3, and the pixel signal of the 3,393-rd pixel is written at the 3,588-th address of the internal memory 34. Here, the 3,588-th address to 3,587-th address belong to the third region of the internal memory 34.

Subsequently, the image signal of the 2nd pixel of the channel 1 received by the rearranging circuit 33 is given the 1st address counted up by one by the address counter (ch1_wr_acount) corresponding to the block 1, and the image signal of the 2nd pixel is written at the 1st address of the internal memory 34. The image signal of the 1,602-nd pixel of the block 2 is given the 1,795-th address counted up by one by the address counter (ch2_wr_acount) and the offset address (ch2_offset1) corresponding to the block 2, and the image signal of the 1,602-nd pixel is written at the 1,795-th address of the internal memory 34. The image signal of the 3,394-th pixel of the block 3 is given the 3,589-th address counted up by one by the address counter (ch3_wr_acount) and the offset address (ch3_offset1) corresponding to the block 3, and the image signal of the 3,394-th pixel is written at the 3,589-th address of the internal memory 34.

By repeating these operations, the image signal of the 3,392-nd pixel of the block 2 finally received by the rearranging circuit 33 is written at the 3,587-th address belonging to the second region of the internal memory 34, and the writing of the image signals of the first line ends.

The second line is described as an even line. When the image signal of each channel of the second line is to be written in the internal memory 34, the addresses corresponding to the nine sub-regions of the internal memory 34 are generated. For address generations of the even line, the rearranging circuit 33 is provided with the address counters (ch1_wr_acount, ch2_wr_acount and ch3_wr_count) for the respective blocks 1, 2 and 3 and the offset addresses (ch2_offset1, ch3_offset1, ch1_offset2, ch2_offset2 and ch3_offset2) for the even line corresponding to the blocks 1, 2 and 3. The address counters (ch1_wr_acount, ch2_wr_acount and ch3_wr_acount) are counted up each time one of the image signals of the blocks 1, 2 and 3 is written. Moreover, the blocks 1, 2 and 3 are cleared in case they cross the regions of the internal memory 34.

The offset addresses (ch2_offset1, ch3_offset1, ch2_offset2 and ch3_offset2) are provided so as to correspond to the capacities of the regions and the sub-regions of the internal memory 34. In the first region: the block 1 has no offset address; the block 2 uses the offset address (ch2_offset2) corresponding to the one-third region (598 bytes); and the block 3 uses the offset address (ch3_offset2) corresponding to the two-third regions (1,196 bytes).

In the second region: the block 1 uses the offset address (ch2_offset1) corresponding to one region; the block 2 uses the offset address (ch2_offset2+ch2_offset2) corresponding to one region and one-third; and the block 3 uses the offset address (ch3_offset2) corresponding to one region and two-thirds.

In the third region: the block 1 uses the offset address (ch3_offset1) corresponding to two regions; the block 2 uses the offset address (ch3_offset2+ch2_offset2) corresponding to two regions and one-third; and the channel 3 uses the offset address (ch3_offset1+ch3_offset2) corresponding to two regions and two-thirds.

The rearranging circuit 33 receives the serialized image signals of the second line, as shown in FIG. 6, from the sampling circuit 32. On the basis of the first clock signal CLK, moreover, the image signals of the 1st pixel, the 1,601-st pixel and the 3,393-rd pixel outputted in parallel from the respective blocks 1, 2 and 3 are written in the first regions (1), (2) and (3) of the internal memory 34 on the basis of the individual pieces of block information.

The image signal of the 1st pixel of the block 1 is given the address, e.g., the 0-th address corresponding to the first of the first sub-region (i.e., the first region (1)) of the first region of the internal memory 34 by the address counter (ch1_wr_acount) corresponding to the block 1, and the image signal of the 1st pixel is written at the 0-th address of the internal memory 34. Here, the 0-th address to the 597-th address belong to the first sub-region (i.e., the first block (1)) of the first region of the internal memory 34.

The image signal of the 1,601-st pixel of the channel 2 is given the address, e.g., the 598-th address corresponding to the first of the second sub-region (i.e., the first region (2)) of the second region of the internal memory 34 by the address counter (ch2_wr_acount) and the offset address (ch2_offset2) corresponding to the channel 2, and the image signal of the 1,601-st pixel is written at the 598-th address of the internal memory 34. Here, the 598-th address to the 1,195-th address belong to the second sub-region (i.e., the first region (2)) of the first region of the internal memory 34.

The image signal of the 3,393-rd pixel of the block 3 is given the address, e.g., the 1,196-th address corresponding to the first of the second sub-region (i.e., the first region (3)) of the second region of the internal memory 34 by the address counter (ch3_wr_acount) and the offset address (ch3_offset2) corresponding to the block 3, and the image signal of the 3,393-rd pixel is written at the 1,196-th address of the internal memory 34. Here, the 1,196-th address to the 1,793-rd address belong to the third sub-region (i.e., the first region (3)) of the third region of the internal memory 34.

Subsequently, the image signal of the 2nd pixel of the block 1 to be received by the rearranging circuit 33 is given the 1st address counted up by one by the address counter (ch1_wr_acount) corresponding to the block 1, and the image signal of the 2nd pixel is written at the 1st address of the internal memory 34. The image signal of the 1,602-nd pixel of the block 2 is given the 599-th address counted up by one by the address counter (ch2_wr_acount) and the offset address (ch2_offset2) corresponding to the block 2, and the image signal of the 1,602-nd pixel is written at the 599-th address of the internal memory 34. The image signal of the 3,394-th pixel of the block 3 is given the 1,197-th address counted up by one by the address counter (ch3_wr_acount) and the offset address (ch3_offset2) corresponding to the block 3, and the image signal of the 3,394-th pixel is written at the 1,197-th address of the internal memory 34.

By repeating these operations, the image signals, as sequentially received by the rearranging circuit 33, of the predetermined pixels of the blocks 1, 2 and 3 are written in the respective sub-regions of the first region of the internal memory 34. The individual sub-regions of the first region of the internal memory 34 can store the image signals of the 598 pixels, respectively. On the other hand, the image signals of the blocks 1, 2 and 3 are outputted for 1,600 pixels, 1,792 pixels and 1,728 pixels, respectively. Therefore, the image signals (ch1_2 and ch1_3) at the 599-th and subsequent pixels of the block 1, the image signals (ch2_2 and ch2_3) at the 2,199-th and subsequent pixels of the block 2 and the image signals (ch3_2 and ch3_3) at the 3,991-st and subsequent pixels of the block 3 cannot be written in the sub-regions of the first region of the internal memory 34. Therefore, the rearranging circuit 33 writes, when it ends the writing in the sub-regions of the first region, the sub-regions (the second regions (1), (2) and (3)) of the second region of the internal memory 34.

The image signal of the 599-th pixel of the block 1 is given the 1,794-th address corresponding to the first of the first sub-region (the second region (1)) of the second region of the internal memory 34 by the address counter (ch1_wr_acount) and the offset address (ch2_offset1) corresponding to the block 1, and the image signal of the 599-th pixel is written at the 1,793-rd address of the internal memory 34. Here, the 1,794-th address to the 2,391-st address belong to the first sub-region (the second region (1)) of the second region of the internal memory 34. Moreover, the address counter (ch1_wr_acount) is reset when a shift is made from the first region to the second region.

The image signal of the 2,199-th pixel of the block 2 is given the 2,392-nd address corresponding to the first of the second sub-region (the second region (2)) of the second region of the internal memory 34 by the address counter (ch2_wr_acount) and the offset address (ch2_offset1+ ch2_offset2) corresponding to the block 2, and the image signal of the 2,199-th pixel is written at the 2,392-nd address of the internal memory 34. Here, the 2,392-nd address to the 2,990-th address belong to the second sub-region (the second region (2)) of the second region of the internal memory 34. Moreover, the address counter (ch2_wr_acount) is reset when a shift is made from the first region to the second region of the internal memory 34.

The image signal of the 3,991-st pixel of the block 3 is given the 2,991-st address corresponding to the first of the third sub-region (the second region (3)) of the second region of the internal memory 34 by the address counter (ch3_wr_acount) and the offset address (ch2_offset1+ ch3_offset2) corresponding to the block 3, and the image signal of the 3,991-st pixel is written at the 2,991-st address of the internal memory 34. Here, the 2,991-st address to the 3,587-th address belong to the third sub-region (the second region (3)) of the second region of the internal memory 34. Moreover, the address counter (ch3_wr_acount) is reset when a shift is made from the first region to the second region of the internal memory 34.

Subsequently, the image signal of the 600-th pixel of the block 1 to be received by the rearranging circuit 33 is given the 1,794-th address counted up by one by the address counter (ch1_wr_acount) and the offset address (ch2_offset1) corresponding to the block 1, and the image signal of the 600-th pixel is written at the 1,794-th address of the internal memory 34. The image signal of the 2,200-th pixel of the block 2 is given the 2,393-rd address counted up by one by the address counter (ch2_wr_acount) and the offset address (ch2_offset1+ch2_offset2) corresponding to the block 2, and the image signal of the 2,200-th pixel is written at the 2,393-rd address of the internal memory 34. The image signal of the 3,992-nd pixel of the block 3 is given the 2,992-nd address counted up by one by the address counter (ch3_wr_acount) and the offset address (ch2_offset1+ch3_offset2) corresponding to the block 3, and the image signal of the 3,992-nd pixel is written at the 2,992-nd address of the internal memory 34.

By repeating these operations, the image signals, as sequentially received by the rearranging circuit 33, of the predetermined pixels of the blocks 1, 2 and 3 are written in the respective sub-regions of the second region of the internal memory 34. The sub-regions of the second region of the internal memory 34 can store the image signals of the 598 pixels, respectively. On the other hand, the image signals of the blocks 1, 2 and 3 are outputted for 1,600 pixels, 1,792 pixels and 1,728 pixels, respectively. Therefore, the image signal (ch1_3) at the 1,197-th and subsequent pixels of the block 1, the image signal (ch2_3) at the 2,797-th and subsequent pixels of the block 2 and the image signal (ch3_3) at the 4,589-th and subsequent pixels of the block 3 cannot be written in the sub-regions of the second region of the internal memory 34. Therefore, the rearranging circuit 33 writes, when it ends the writing in the individual sub-regions of the second region, the sub-regions (the third regions (1), (2) and (3)) of the third region of the internal memory 34.

The image signal of the 1,197-th pixel of the block 1 is given the 3,588-th address corresponding to the first of the first sub-region (the third region (1)) of the third region of the internal memory 34 by the address counter (ch3_wr_acount) and the offset address (ch2_offset1) corresponding to the block 1, and the image signal of the 1,197-th pixel is written at the 3,588-th address of the internal memory 34. Here, the 3,588-th address to the 4,185-th address belong to the first sub-region (the third region (1)) of the third region of the internal memory 34. Moreover, the address counter (ch1_wr_acount) is reset when a shift is made from the second region to the third region.

The image signal of the 2,797-th pixel of the block 2 is given the 4,186-th address corresponding to the first of the second sub-region (the third region (2)) of the third region of the internal memory 34 by the address counter (ch2_wr_acount) and the offset address (ch3_offset1+ ch2_offset2) corresponding to the block 2, and the image signal of the 2,797-th pixel is written at the 4,186-th address of the internal memory 34. Here, the 4,186-th address to the 4,783-rd address belong to the second sub-region (the third region (2)) of the third region of the internal memory 34. Moreover, the address counter (ch2_wr_acount) is reset when a shift is made from the second region to the third region of the internal memory 34.

The image signal of the 4,589-th pixel of the block 3 is given the 4,784-th address corresponding to the first of the third sub-region (the third region (3)) of the third region of the internal memory 34 by the address counter (ch3_wr_acount) and the offset address (ch3_offset1+ch3_offset2) corresponding to the block 3, and the image signal of the 4,784-th pixel is written at the 4,784-th address of the internal memory 34. Here, the 4,784-th address to the 5,381-st address belong to the third sub-region (the third region (3)) of the third region of the internal memory 34. Moreover, the address counter (ch3_wr_acount) is reset when a shift is made from the second region to the third region of the internal memory 34.

Subsequently, the image signal of the 1,198-th pixel of the block 1 to be received by the rearranging circuit 33 is given the 3,589-th address counted up by one by the address counter (ch1_wr_acount) and the offset address (ch3_offset1) corresponding to the block 1, and the image signal of the 1,189-th pixel is written at the 3,589-th address of the internal memory 34. The image signal of the 2,798-th pixel of the block 2 is given the 4,187-th address counted up by one by the address counter (ch2_wr_acount) and the offset address (ch3_offset1+ch2_offset2) corresponding to the block 2, and the image signal of the 2,798-th pixel is written at the 4,187-th address of the internal memory 34. The image signal of the 4,590-th pixel of the block 3 is given the 4,785-th address counted up by one by the address counter (ch3_wr_acount) and the offset address (ch3_offset1+ch3_offset2) corresponding to the block 3, and the image signal of the 4,590-th pixel is written at the 4,785-th address of the internal memory 34.

By repeating these operations, the image signal of the 3,392-nd pixel of the block 2 finally received by the rearranging circuit 33 is written at the 5,381-st address belonging to the second sub-region (the third region (2)) of the third region of the internal memory 34, and the writing of the image signals of the second line ends.

The reading of the image signals from the internal memory 34 by the rearranging circuit 33 is described with reference to FIG. 7 and FIG. 8. As described hereinbefore, the rearranging circuit 33 writes the outputs of each lines of the image signal by changing the method of writing in the internal memory 34 for the odd line and for the even line so that the reading of the image signals from the internal memory 34 is performed according to the writing methods of each of the lines.

The first line is described as the reading of the odd line. As shown in FIG. 7 and FIG. 8, the image signals of the block 1 of the first line are written in the first region of the internal memory 34. The rearranging circuit 33 writes and reads the internal memory 34 simultaneously. While the image signals are being written in any region or sub-region of the internal memory 34, it is possible to read out the image signals stored in another region or sub-region or in the region or sub-region performing the writing operation. Moreover, the rearranging circuit 33 has a higher reading speed than the writing speed. The rearranging circuit 33 includes the address counter (rd_acount) shared among the individual blocks for reading the first line, and the offset addresses (ch2_offset1, ch3_offset1, ch1_offset2, ch2_offset2 and ch3_offset2) corresponding to the blocks and the individual regions. Here, the offset addresses at the writing time can be used. Moreover, the address counters are reset by shifting between the switching of the read block and the region.

Figure 8:
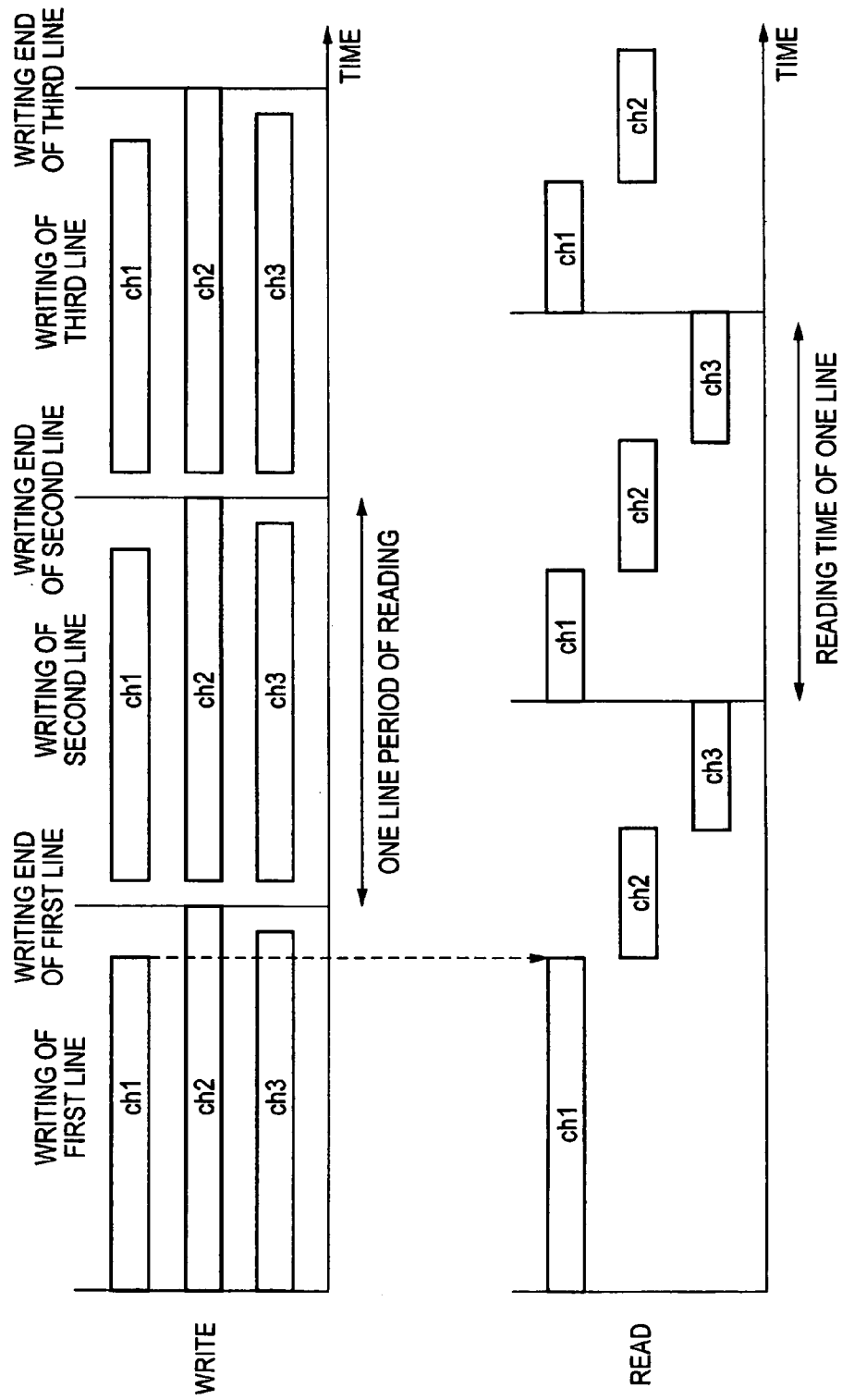
FIG. 8 is a diagram showing relations of the writing/reading in/from the internal memory.

As shown in FIG. 8, the image signal of the block 1 of the first line is read out simultaneously as they are written in the first region of the internal memory 34. This image signal of the block 1 is the image signal at the 1,600-th pixel from the 1st pixel of the first line. Moreover, the image signals from the 1st pixel to the 1,600-th pixel are written to be sequentially arranged in the first region of the internal memory 34 according to the array of the photoelectric conversion elements of the image sensor 24 in the main scanning direction. Therefore, the rearranging circuit 33 is enabled, by reading the first region of the internal memory 34 while sequentially counting up according to the address counter (rd_acount), to read the image signals sequentially from the 1st pixel to the 1,600-th pixel of the first line of the image sensor 24.

When the rearranging circuit 33 reads out all the image signals written in the first region of the internal memory 34, the image signals more than those written at least in the first region are written in the second region. The rearranging circuit 33 reads out the first region of the internal memory 34 and then reads out the second region. In the second region, the image signals of the block 2, i.e., the image signals from the 1,601-st pixel to the 3,392-nd pixel of the first line are written so as to be sequentially arranged according to the array of the photoelectric conversion elements of the image sensor 24 in the main scanning direction. Therefore, the rearranging circuit 33 reads out the second region of the internal memory 34 while sequentially counting up according to the address counter (rd_acount) and the offset address (ch2_offset1), so that it can read out the image signals sequentially from the 1,601-st pixel to the 3,392-nd pixel of the first line of the image sensor 24.

When the rearranging circuit 33 reads out all the image signals written in the second region of the internal memory 34, the rearranging circuit 33 has already written the third region. Therefore, the rearranging circuit 33 reads out the second region of the internal memory 34 and then reads out the third region. In the third region, the image signals of the block 3, i.e., the image signals from the 3,93-rd pixel to the 5,120-th pixel of the first line are written so as to be sequentially arranged according to the array of the photoelectric conversion elements of the image sensor 24 in the main scanning direction. Therefore, the rearranging circuit 33 reads out the third region of the internal memory 34 while sequentially counting up according to the address counter (rd_acount) and the offset address (ch3_offset1), so that it can read out the image signals sequentially from the 3,393-rd pixel to the 5,120-th pixel of the first line of the image sensor 24. Thus, the reading of the data of one line ends. Here, the reading from each of the regions of the internal memory 34 is so controlled in the rearranging circuit 33 that it may not exceed the writing in the respective regions of the same line.

The second line is described as the reading of the even lines. As shown in FIG. 7 and FIG. 8, the image signals (ch1_1, ch1_2 and ch1_3) of the block 1 of the second line are divided into three and written in the first sub-region (the first region (1)) of the first region of the internal memory 34, the first sub-region (the second region (1)) of the second region, and the first sub-region (the third region (1)) of the third region.

In the first sub-region (the first region (1)) of the first region, more specifically, the pixel signals (ch1_1) of the 1st pixel to the 598-th pixel of the second line of the block 1 are so written as to be sequentially arranged according to the array of the photoelectric conversion elements of the image sensor 24 in the main scanning direction. In the first sub-region (the second region (1)) of the second region, the pixel signals (ch1_2) of the 599-th pixel to the 1,196-th pixel of the second line of the block 1 are so written as to be sequentially arranged according to the array of the photoelectric conversion elements of the image sensor 24 in the main scanning direction. In the first sub-region (the third region (1)) of the third region, the pixel signals (ch1_3) of the 1,197-th pixel to the 1,600-th pixel of the second line of the block 1 are so written as to be sequentially arranged according to the array of the photoelectric conversion elements of the image sensor 24 in the main scanning direction.

The rearranging circuit 33 reads out the image signals sequentially from the 1st pixel to the 598-th pixel of the second line of the image sensor 24 by reading out the first sub-region (the first region (1)) of the first region of the internal memory 34 while sequentially counting up according to the address counter (rd_acount).

After that, the address counter (rd_acount) is reset. Subsequently, the rearranging circuit 33 reads out the image signals sequentially from the 599-th pixel to the 1,196-th pixel of the second line of the image sensor 24 by reading out the first sub-region (the second region (1)) of the second region of the internal memory 34 while sequentially counting up according to the address counter (rd_acount) and the offset address (ch2_offset1).

After that, the address counter (rd_acount) is reset again. Subsequently, the rearranging circuit 33 reads out the image signals sequentially from the 1,197-th pixel to the 1,600-th pixel of the second line of the image sensor 24 by reading out the first sub-region (the third region (1)) of the third region of the internal memory 34 while sequentially counting up according to the address counter (rd_acount) and the offset address (ch3_offset1). As a result, all the image signals of the block 1 of the second line of the image sensor 24 are read out sequentially of the main scanning direction.

When the rearranging circuit 33 reads out all the image signals of the block 1 of the second line, the image signals of the pixel number or more of the block 1 of the second line are respectively written in the second sub-region (the first region (2)) of the first region, the second sub-region (the second region (2)) of the second region, and the second sub-region (the third region (2)) of the third region.

In the second sub-region (the first region (2)) of the first region, more specifically, the pixel signals (ch2_1) of the 1,601-st pixel to the 2,198-th pixel of the second line of the block 1 are so written as to be sequentially arranged according to the array of the photoelectric conversion elements of the image sensor 24 in the main scanning direction. In the second sub-region (the second region (2)) of the second region, the pixel signals (ch2_2) of the 2,199-th pixel to the 2,796-th pixel of the second line of the block 1 are so written as to be sequentially arranged according to the array of the photoelectric conversion elements of the image sensor 24 in the main scanning direction. In the second sub-region (the third region (2)) of the third region, the pixel signals (ch1_3) of the 2,797-th pixel to the 3,392-nd pixel of the second line of the block 1 are so written as to be sequentially arranged according to the array of the photoelectric conversion elements of the image sensor 24 in the main scanning direction.

The rearranging circuit 33 reads out the image signals sequentially from the 1,601-st pixel to the 2,198-th pixel of the second line of the image sensor 24 by reading out the second sub-region (the first region (2)) of the first region of the internal memory 34 while sequentially counting up according to the address counter (rd_acount) and the offset address (ch2_offset2).

After that, the address counter (rd_acount) is reset. Subsequently, the rearranging circuit 33 reads out the image signals (ch2_2) sequentially from the 2,199-th pixel to the 2,796-th pixel of the second line of the image sensor 24 by reading out the second sub-region (the second region (2)) of the second region of the internal memory 34 while sequentially counting up according to the address counter (rd_acount) and the offset address (ch2_offset1+ch2_offset2).

After that, the address counter (rd_acount) is reset again. Subsequently, the rearranging circuit 33 reads out the image signals (ch2_3) sequentially from the 2,797-th pixel to the 3,392-nd pixel of the second line of the image sensor 24 by reading out the second sub-region (the third region (2)) of the third region of the internal memory 34 while sequentially counting up according to the address counter (rd_acount) and the offset address (ch3_offset1+ch2_offset2).

When the rearranging circuit 33 reads out all the image signals of the block 2 of the second line, the image signals of the block 3 of the second line are respectively written in the third sub-region (the first region (3)) of the first region, the third sub-region (the second region (3)) of the second region, and the third sub-region (the third region (3)) of the third region.

In the third sub-region (the first region (3)) of the first region, more specifically, the pixel signals (ch3_1) of the 3,393-rd pixel to the 3,990-th pixel of the second line of the block 1 are so written as to be sequentially arranged according to the array of the photoelectric conversion elements of the image sensor 24 in the main scanning direction. In the third sub-region (the second region (3)) of the second region, the pixel signals (ch3_2) of the 3,991-st pixel to the 4,588-th pixel of the second line of the block 1 are so written as to be sequentially arranged according to the array of the photoelectric conversion elements of the image sensor 24 in the main scanning direction. In the third sub-region (the third region (3)) of the third region, the pixel signals (ch3_3) of the 4,589-th pixel to the 5,120-th pixel of the second line of the block 1 are so written as to be sequentially arranged according to the array of the photoelectric conversion elements of the image sensor 24 in the main scanning direction.

The rearranging circuit 33 reads out the image signals sequentially from the 3,393-rd pixel to the 3,990-th pixel of the second line of the image sensor 24 by reading out the third sub-region (the first region (3)) of the first region of the internal memory 34 while sequentially counting up according to the address counter (rd_acount) and the offset address (ch3_offset2).

After that, the address counter (rd_acount) is reset. Subsequently, the rearranging circuit 33 reads out the image signals sequentially from the 3,991-st pixel to the 4,588-th pixel of the second line of the image sensor 24 by reading out the third sub-region (the second region (3)) of the second region of the internal memory 34 while sequentially counting up according to the address counter (rd_acount) and the offset address (ch2_offset1+ch3_offset2).

After that, the address counter (rd_acount) is reset again. Subsequently, the rearranging circuit 33 reads out the image signals (ch3_3) sequentially from the 4,589-th pixel to the 5,120-th pixel of the second line of the image sensor 24 by reading out the third sub-region (the third region (3)) of the third region of the internal memory 34 while sequentially counting up according to the address counter (rd_acount) and the offset address (ch3_offset1+ch3_offset2). Thus, the reading of the image signals of the second line ends.

Thus, the rearranging circuit 33 generates the predetermined addresses by separating the image signals to be outputted as one line in the main scanning direction by the image sensor 24, for the odd line and the even line. The rearranging circuit 33 generates the addresses such that any of such regions of the internal memory 34 as have ended the reading of the image signals written beforehand may be assigned to the individual blocks 1, 2 and 3 of the odd line. The rearranging circuit 33 generates the addresses such that the blocks 1, 2 and 3 may be assigned to the individual sub-regions of such regions of the internal memory 34 as have ended the reading of the image signals written beforehand. As a result, there is eliminated the overwrite, in which a new image signal is written in the individual regions of the internal memory 34 before read. Moreover, the address generations can be so easily made that the overwrite may not occur in the internal memory 34.

For example, when the rearranging circuit 33 finishes the writing of all the image signals of the blocks 1, 2 and 3 of the first line in the internal memory 34, as shown in FIG. 8, the reading of the image signals of the block 1 written in the first region of the internal memory 34 ends. As a result, the rearranging circuit 33 can write the image signals of the blocks 1, 2 and 3 sequentially without the overwrite in the individual sub-regions of the first region of the internal memory 34.

When the rearranging circuit 33 writes the image signals of the second line, it performs the writing the sub-regions of each region in the order of the first region, the second region and the third region, and the image signals of the first line are also read out in the order of the first region, the second region and the third region. When the rearranging circuit 33 finishes the writing of the image signals of the second line in the individual sub-regions of the first region, the reading of the image signals of the block 2 of the first line from the second region of the internal memory 34 ends.

When the rearranging circuit 33 finishes the writing of the image signals of the second line in the sub-regions of the second region, the reading of the image signals of the block 3 of the first line from the third region of the internal memory 34 ends. When, therefore, the rearranging circuit 33 performs the writing of the image signals of the second line in the sub-regions of the individual regions in the order of the first region, the second region and the third region, the image signals of the first line already written in the region to be written are read out. Therefore, the overwrite does not occur.

This reading/writing of the image signals in/from the internal memory 34 on the first line and the second line is likewise repeated for the odd line and the even line so that the reading/writing of the image signals in the internal memory 34 is realized.

The image signals rearranged by the rearranging circuit 33 in the order of the main scanning direction of the image sensor 24 are outputted to the wait circuit 37 (or output adjusting section). The wait circuit 37 outputs the image signals outputted from the rearranging circuit 33, to a dark correction circuit of the correction processing circuit 35 while adjusting the output so that the image signals of a predetermined number or more may not be outputted for a predetermined period. Specifically, the wait circuit 37 is equipped with a counter for counting the period for every 16 pixels. Till that period is reached, the wait circuit 37 holds the image signals outputted from the rearranging circuit 33, and stops the outputting to the correction processing circuit 35. When that period is reached, moreover, the wait circuit 37 outputs the image signals held to the correction processing circuit 35. Here, the counter may be set not with the pixel number but with the time.

The correction processing circuit 35 is configured to include a dark correction circuit for correcting the dispersion between the photoelectric conversion elements on the basis of dark reference data, a shading correction circuit for correcting the dispersion of the light source between the photoelectric conversion elements on the basis of white reference data, a gamma correction circuit for performing the correction of a γ curve, a resolution correction circuit for correcting the resolution, and an output circuit for outputting data after the correction processing. Of these, the dark correction circuit, the shading correction circuit, the gamma correction circuit, the resolution correction circuit and the output circuit are well known in the art, and their detailed description is omitted.

Moreover, the correction processing circuit 35 is connected to transmit/receive the data to/from the external memory 36 as the output destination of the individual pieces of correction data to be used for the dark correction or the shading correction or the correction-corrected data. The external memory 36 is the so-called "RAM", which can be accessed by the CPU or another device for storing the data temporarily. The internal memory 34 disposed in the rearranging circuit 33 is used as the storage section for the rearranging circuit 33 to rearrange so that the rearranging circuit 33 can access the internal memory 34 at a high speed thereby to read/write the image signals at a high speed. On the other hand, the external memory 36 is used as the output data destination after correction-processed by the correction processing circuit 35 or the storage destination of the correction data thereby to easily cope with the enlargement or the like of the buffer capacity of the output data.

The image signals are not outputted to the correction processing circuit 35 till pixels of a predetermined number are outputted from the rearranging circuit 33 to the wait circuit 37. In this meanwhile, the correction processing circuit 35 does not access the external memory 36 because of the dark correction, the shading correction or the data output after the correction processing. As a result, the correction processing circuit 35 is prevented from occupying the access to the external memory. Even if, therefore, the access of the correction processing circuit 35 is given a priority of a higher order than the access of the CPU or the like as the access to the external memory 36, the CPU or the like can access to the external memory 36 while the output being adjusted by the wait circuit 37. As a result, the system including the control unit 30 is prevented from being broken down.

On the other hand, the sampling period of the sampling circuit 32 is set equal to or longer than the period, for which the correction processing circuit 35 corrects the unit photoelectric conversion element, i.e., the image signals of one pixel. As a result, the rearranging circuit 33 can output the image signals read from the internal memory 34 quicker than the sampling circuit 32 samples the image signals and outputs them to the rearranging circuit 33. In other words, the outputting of the rearranging circuit 33 is not caused to wait by the correction processing of the correction processing circuit 35 to prevent the image signals from being inputted, more than the output of the image signals from the rearranging circuit 33, from the sampling circuit 32 to the rearranging circuit 33. As a result, the rearranging circuit 33 prevents the writing in the internal memory before the reading from the internal memory 34, thereby to prevent the overwrite in the internal memory 34.

Thus, according to the present image reading apparatus 1, the image signals of the individual blocks 1, 2 and 3 are outputted in parallel from the image sensor 24 so that the image reading by the image sensor 24 is speeded up. Moreover, the storage area of the internal memory is equally divided into the three regions and the three sub-regions of the number equal to the block number thereby to facilitate the address generations of the areas for read/write the image signals of the individual blocks 1, 2 and 3. Moreover, when the image signals are written in the internal memory 34, such one of the individual regions as has ended the reading of the image signals written beforehand is assigned so that the overwrite is not done. As a result, the storage area of the internal memory 34 is efficiently used to reduce the storage area required of the internal memory 34.

Here, the aspect has been described on the case, in which all the 5,120 pixels of the image sensor 24 are used. However, the invention can be naturally applied to the case, in which a portion of the image sensor 24 is used as the effective pixel area. In the so-called center registration in which the medium to be read is arranged with reference to the center relative to the image sensor 24, for example, the outputs of the photoelectric conversion elements are unnecessary on the two sides of the image sensor 24 where the read medium is absent, for the read medium having a width failing to reach the length of the image sensor 24 in the main scanning direction. It is, therefore, sufficient to process only the image signals which are outputted by the photoelectric conversion elements having received the reflected light from the read medium. Thus, the pixels corresponding to the area for receiving the reflected light from the read medium, i.e., the area where the read medium is arranged with respect to the image sensor 24 are called the effective pixel area.

The sampling circuit 32 may also output only such image signals of the individual blocks 1, 2 and 3 of the image sensor 24 as are outputted by the photoelectric conversion elements belonging to the effective pixel area for receiving the reflected light from the read medium. In case, for example, the read medium is arranged in a center registration with respect to the image sensor 24 but not on the two end sides of the image sensor 24, the image signals from the first pixel of the block 1 to the predetermined pixel where one end of the read medium exists and from the predetermined pixel where the other end of the read medium of the block 3 exists to the 5,120-th pixel need be neither rearranged nor corrected. The image signals other than those in the effective pixel area are not sampled so that the storage area of the internal memory 34 to be used by the rearranging circuit 33 is more effectively used.

In the aspect, moreover, the photoelectric conversion elements of the image sensor 24 have made such division that the pixel number contained in the block 2 at the center side of the image sensor 24 may be the maximum. Considering that the read medium is arranged in the center registration with respect to the image sensor 24, as described hereinbefore, it is proper to make a division so that the element number of the block 2 at the center of the main scanning direction of the image sensor 24 may be the minimum.

In a case where the read medium is arranged in the center registration with respect to the image sensor 24, the photoelectric conversion elements on the two end sides of the image sensor 24 may not be used depending on the width of the read medium. It is, however, estimated that the photoelectric conversion elements at the center of the image sensor 24 are always used irrespective of the width of the read medium. In the center registration, the effective pixel area of the image sensor 24 is located near the center so that the image signals outputted by the block 2 are sampled at all times, but portions of the blocks 1 and 3 are outside of the effective pixel area so that the partial image signals are not sampled. In case, therefore, the number of the photoelectric conversion elements contained in the block 2 at the center of the image sensor 24 are minimized so that the two end sides of the image sensor 24 are not used as the effective pixel area, the quantities of the image signals to be sampled from the individual blocks 1, 2 and 3 takes a small difference. As a result, the later rearranging circuit 33 can make more effective use of the internal memory 34, in which the equal division of the individual regions or sub-regions of the internal memory 34 are equally divided in conformity with the maximum pixel number. Of course, the number of the photoelectric conversion elements of the individual blocks of the case, in which the photoelectric conversion elements of the image sensor 24 are divided into a plurality blocks in the invention, is arbitrary. It is, therefore, needless to say that the block number or the number of pixels of the individual blocks in the aspect or its modification are just an example.

As was described, according to the aspect of the invention, there is provided an image reading apparatus including: an image sensor for outputting image signals in parallel from individual blocks composed of an arbitrary element group, into which photoelectric conversion elements arrayed in a main scanning direction are divided; a serial transmission section for serializing and outputting the image signals outputted in parallel from the image sensor; a sampling section for sampling the serialized image signals to add and output the blocks, to which the image signals belong, as block information to the individual image signals; storage section for storing the image signals on the basis of a predetermined address; and a rearranging section for giving addresses to write/read the storage section on the basis of the block information so that the image signals may be arrayed from the head for the individual blocks in the main scanning direction of the image sensor, thereby to read/write the sampled image signals from/in the storage section.

The image signals of the individual blocks are outputted in parallel from the image sensor. In other words, the image signals of the block division number are outputted all at once to the operation clock of the image sensor so that the image reading of the image sensor is speeded up. The image signals of the individual blocks outputted in parallel from the image sensor are serialized, and block information is added to them. On the basis of the block information, the rearranging section generates address so that the image signals may be arranged for the individual blocks from the head of the main scanning direction of the image sensor, thereby to write and read the image signals for the storage section. As a result, the image signals outputted in parallel from the image sensor are rearranged into data of one line continuing in the main scanning direction.

Moreover, the rearranging section may divide the storage area of the storage section into regions of the same number as that of the blocks of the image sensor and the individual regions into sub-regions of the same number as that of the blocks, so that the image signals may be read/written from/in the storage section with addresses generated on the basis of address counters for the individual blocks and offset addresses corresponding to the regions and the sub-regions.

The storage area of the storage section is divided into regions and sub-regions of the same number of the blocks thereby to facilitate the address generation for the area, in which the image signals of the individual blocks are to be read and written.

Moreover, the rearranging section may generate predetermined addresses by dividing the image signals, to which the block information is added by the sampling section, into an odd line and an even line, the addresses by assigning any of such one of the individual regions of the storage section that the reading of the image signal written beforehand has been ended, to the individual blocks of one of the odd line or the even line, and the addresses by assigning each sub-region of any of such one of the individual regions of the storage section that the reading of the image signal written beforehand has been ended, to the individual blocks of the other of the odd line or the even line.

To the individual blocks of one line of the odd line or the even line, there is assigned any of such one of the individual regions of the storage section that the reading of the image signal written beforehand has been ended, thereby to apply the addresses corresponding to that region. As a result, the new image signal is not written in the image signals before read, in the individual regions.

To the individual blocks of one line of the odd line or the even line, there are assigned the individual blocks for the individual sub-regions of any of such one of the individual regions of the storage section that the reading of the image signal written beforehand has been ended, thereby to apply the addresses. As described hereinbefore, the individual blocks of one line are assigned to any region of the storage section, so that the image signals of that block are written and read. To the individual blocks of the other line, there is assigned any of the regions having ended the reading of the image signals of one line so that the new image signals are not written in the region before read. In other words, the image signals of one line before read in each region are not overwritten. Moreover, the individual blocks are assigned to the individual sub-regions of that region. Therefore, the image signals of the individual blocks can be sequentially written in that region. When the writing of that region is ended, another region having ended the reading of the image signals of one line is likewise assigned. By repeating these operations, the overwrite is not done on the image signals before read in each region. As a result, the storage area of the storage section is efficiently used to reduce the storage area required of the storage section.

Moreover, it is preferred that the storage section has its storage area equally divided into a plurality of regions and each of its regions divided into a plurality of sub-regions.

It is also preferred that the regions of the storage section have capacities capable of storing the image signals of the blocks of the maximum pixel number of the image sensor.

Moreover, the rearranging section may read, while the image signals are being written in any of the regions or sub-regions of the storage section, the image signals stored in the remaining regions or sub-regions.

As a result, while the image signals are being written in any region or sub-region, the reading of any of the remaining regions or sub-regions is ended. After the image signals were written in any region or sub-region, therefore, any of the remaining regions or sub-regions is in the state capable of writing the image signals.

Moreover, it is preferred that the image sensor is made such that the photoelectric conversion elements arrayed in the main scanning direction are divided into three.

Moreover, it is preferred that the image sensor is so divided that the number of the photoelectric conversion elements of the block at the center of the main scanning direction may be the minimum.

In the so-called center registration where the center of the read medium is substantially aligned with the center of the image sensor, the photoelectric conversion elements on the two end sides of the image sensor may not receive the reflected light in dependence upon the width of the read medium. On the other hand, the read medium is always arranged at the center of the image sensor irrespective of the width. In other words, in the center registration, the effective pixel area of the image sensor is close to the center. In case the two end sides of the image sensor are not used as the effective pixel area by minimizing the element number of the block at the center of the image sensor, the difference in the quantity between the image signals outputted from the individual blocks becomes small. As a result, it is possible to make effective use of the individual regions or sub-regions of the storage section.

Moreover, the sampling section may output only the image signals which are outputted by the photoelectric conversion elements belonging to the effective pixel area for receiving the reflected light from a medium to be read, of the individual blocks of the image sensor.

As a result, the storage area of the storage section is more efficiently used so that it is further reduced.

Moreover, the image reading apparatus may further comprise correction processing section for correcting a dispersion between the individual photoelectric conversion elements of the image sensor, for the image signals outputted by the rearranging section, and the sampling period of the sampling section may be set equal to or more than the period, for which the correction processing section corrects the image signals of a unit photoelectric conversion element.

As a result, the sampling section can sample the image signals faster than the outputting of the rearranging section so that the rearranging section can output the image signals read from the storage. As a result, the overwrite on the image signals before read is not performed at the storage section.

Moreover, the storage section for the rearranging section to store the image signals may use an internal memory disposed in a circuit configuring the rearranging section, and an external memory may be used as the destination of the output data after the correction processing. The image reading apparatus may further comprise output adjusting section for adjusting the image signals outputted by the rearranging section, not to an output of a predetermined or more number for a predetermined time period.

Since the internal memory is used in the storage section, the rearranging section can quickly access the internal memory so that the reading/writing of the image signals can be performed at a high speed. The external memory to be used as the output data destination after corrected is used not only as the correction processing section but also as the work memory of a CPU, for example. This external memory may store the correction data to be used for the correction processing. The output adjusting section performs such an adjustment that the image signals outputted from the rearranging section may not exceed a predetermined number for a predetermined period. For example, the output adjusting section holds the image signals outputted by the rearranging section, till the image signals become a predetermined number. For this holding period, the output adjusting section holds the image signals outputted by the rearranging section, till the image signals becomes a predetermined number. For this holding period, the correction processing section does not access the external memory. As a result, the correction processing section is prevented from occupying the access to the external memory thereby to avoid the breakdown of the system including the CPU.

Moreover, the serial transmission section may include an analog-digital converter for digitally converting the analog image signals outputted by the image sensor.

Moreover, the serial transmission section may include an analog switch for serializing the analog image signals before the analog-digital converter converts the image signals digitally.

As a result, the analog-digital converter can be shared among the individual blocks thereby to lower the cost.

Moreover, the serial transmission section includes the analog-digital converter for each of the blocks of the image sensor thereby to serialize the digitally converted image signals of each of the blocks.

As a result, the digital conversion speed of each block is improved to raise the processing speed.

What is claimed is:
1. An image reading apparatus comprising:
   an image sensor that outputs image signals in parallel from each of blocks composed of an element group, photoelectric conversion elements arrayed in a main scanning direction being divided into the blocks;
   a serial transmission section that serializes and outputs the image signals outputted in parallel from the image sensor;
   a sampling section that samples the serialized image signals to add the blocks, to which the image signals belong, as block information to the respective image signals;
   a storage section that stores the image signals on the basis of predetermined addresses; and
   a rearranging section that gives addresses for accessing to the storage section on the basis of the block information so that the image signals are arrayed from a head for the respective blocks in the main scanning direction of the image sensor, thereby to read/write the sampled image signals from/in the storage section.

2. The image reading apparatus according to claim 1, wherein the rearranging section divides a storage area of the storage section into regions of the same number as that of the blocks of the image sensor and divides the respective regions into sub-regions of the same number as that of the blocks, so that the image signals are read/written from/in the storage section with addresses generated on the basis of address counters for the respective blocks and offset addresses corresponding to the regions and the sub-regions.

3. The image reading apparatus according to claim 2, wherein the rearranging section generates the predetermined addresses for an odd line and an even line, respectively,
   the addresses are generated by assigning to the respective blocks of one of the odd line and the even line such one of the regions of the storage section whose reading of the image signal written beforehand has ended, and
   the addresses are generated by assigning to the respective blocks of the other of the odd line and the even line such one of the sub-regions of the region whose reading of the image signal written beforehand has ended.

4. The image reading apparatus according to claim 2, wherein the storage section has the storage area equally divided into the regions and each of the regions is divided into the sub-regions.

5. The image reading apparatus according to claim 2, wherein the regions of the storage section have capacities capable of storing the image signals of the block having the maximum pixel number.

6. The image reading apparatus according to claim 2, wherein the rearranging section reads, while the image signals are being written in any of the regions and the sub-regions of the storage section, the image signals stored in the remaining regions or sub-regions.

7. The image reading apparatus according to claim 1, wherein the photoelectric conversion elements of the image sensor, which are arrayed in the main scanning direction, are divided into 3n blocks, wherein n is an integer.

8. The image reading apparatus according to claim 7, wherein the image sensor is so divided that the numbers of the photoelectric conversion elements of the blocks are different.

9. The image reading apparatus according to claim 1, wherein the sampling section outputs only the image signals, which are outputted by the photoelectric conversion elements belonging to an effective pixel area for receiving reflected light from a document to be scanned, of the blocks of the image sensor.

10. The image reading apparatus according to claim 1, further comprising a correction processing section that corrects a dispersion between the photoelectric conversion elements of the image sensor, for the image signals outputted by the rearranging section, wherein a sampling period of the sampling section is set equal to or more than a period, for which the correction processing section corrects the image signals of a unit photoelectric conversion element.

11. The image reading apparatus according to claim 10, further comprising an output adjusting section that adjusts the image signals outputted by the rearranging section, wherein the storage section for the rearranging section, which stores the image signals, uses an internal memory disposed in a circuit configuring the rearranging section, and an external memory is used as a destination of the output data after the correction processing.

12. The image reading apparatus according to claim 1, wherein the serial transmission section comprises an analog-digital converter for digitally converting the analog image signals outputted by the image sensor.

13. The image reading apparatus according to claim 12, wherein the serial transmission section comprises an analog switch for serializing the analog image signals before the analog-digital converter converts the image signals.

14. The image reading apparatus according to claim 12, wherein the serial transmission section comprises the analog-digital converter for each of the blocks of the image sensor thereby to serialize the digitally converted image signals of each of the blocks.

15. A data processing method for use in an image reading apparatus including an image sensor that outputs image signals in parallel from each of blocks composed of an element group, photoelectric conversion elements arrayed in a main scanning direction being divided into the blocks, the method comprising:

serializing and outputting the image signals outputted in parallel from the image sensor;

sampling the serialized image signals to add the blocks, to which the image signals belong, as block information to the respective image signals;

storing the image signals on the basis of predetermined addresses; and giving addresses for accessing to a storage section on the basis of the block information and arraying the image signals from a head for the respective blocks in the main scanning direction of the image sensor, thereby to read/write the sampled image signals from/in the storage section.

16. The data processing method according to claim 15, wherein when giving addresses, a storage area of the storage section is divided into regions of the same number as that of the blocks of the image sensor and the respective regions are divided into sub-regions of the same number as that of the blocks, so that the image signals are read/written from/in the storage section with addresses generated on the basis of address counters for the respective blocks and offset addresses corresponding to the regions and the sub-regions.

17. The data processing method according to claim 16, wherein when giving addresses the predetermined addresses are generated while dividing the image signals, to which the block information is added, into an odd line and an even line, the addresses are generated by assigning to the respective blocks of one of the odd line and the even line such one of the regions of the storage section whose reading of the image signal written beforehand has ended, and the addresses are generated by assigning to the respective blocks of the other of the odd line and the even line such one of the sub-regions of the region whose reading of the image signal written beforehand has ended.

18. The data processing method according to claim 16, wherein while the image signals are being written in any of the regions and the sub-regions of the storage section, the image signals stored in the remaining regions or sub-regions are read.

* * * * *